April 15, 1952  S. SULKOWSKI, JR  2,593,360
CONVERTIBLE TOP FOR AUTOMOBILES
Filed Feb. 14, 1951  2 SHEETS—SHEET 1
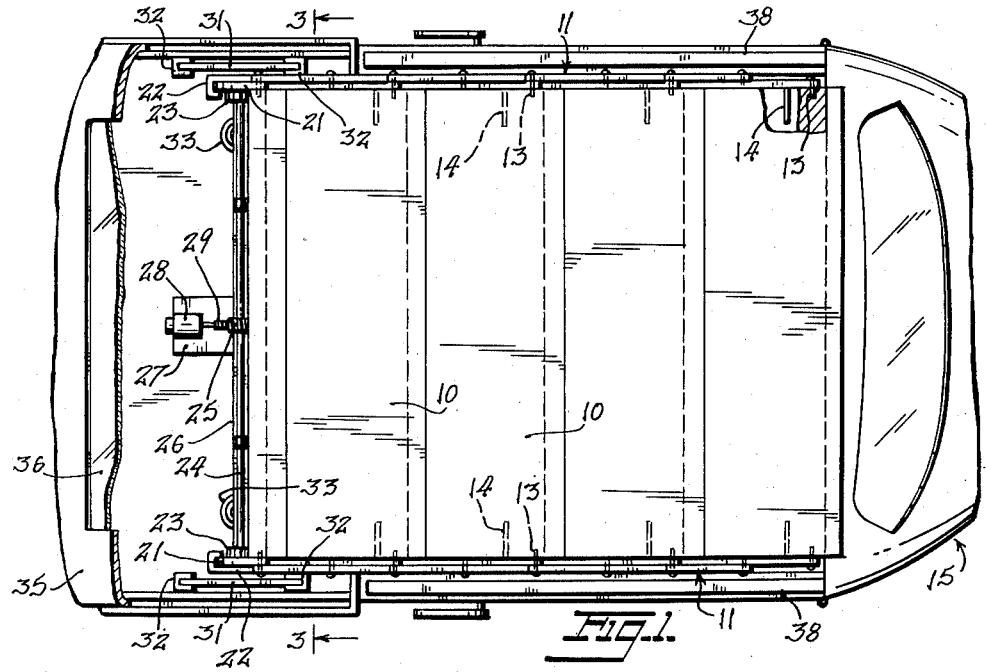
Fig. 1.
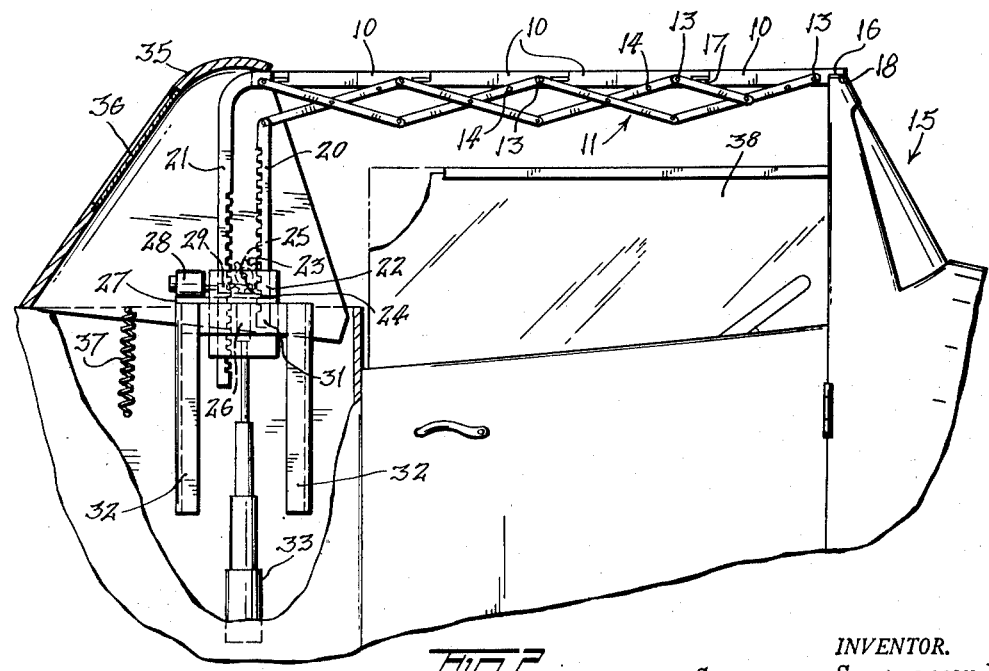
Fig. 2.
INVENTOR.
STANLEY SULKOWSKI, JR
BY 
ATTORNEY

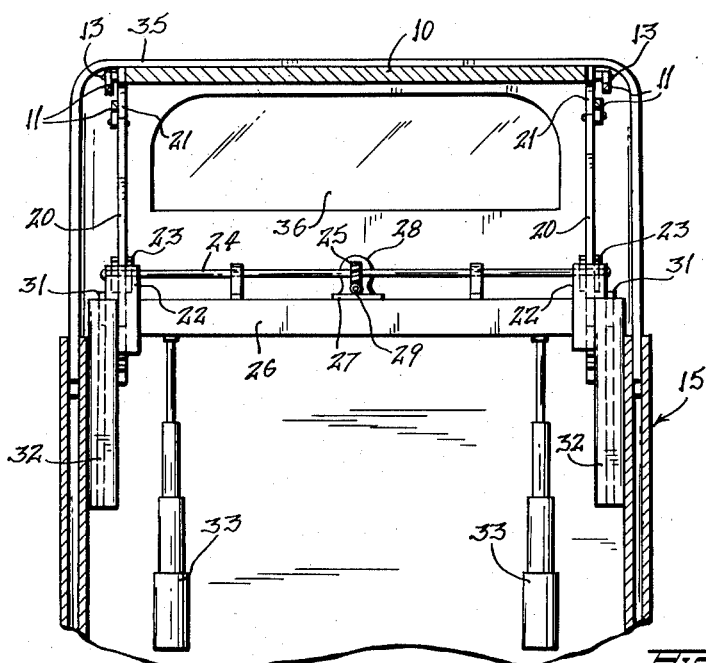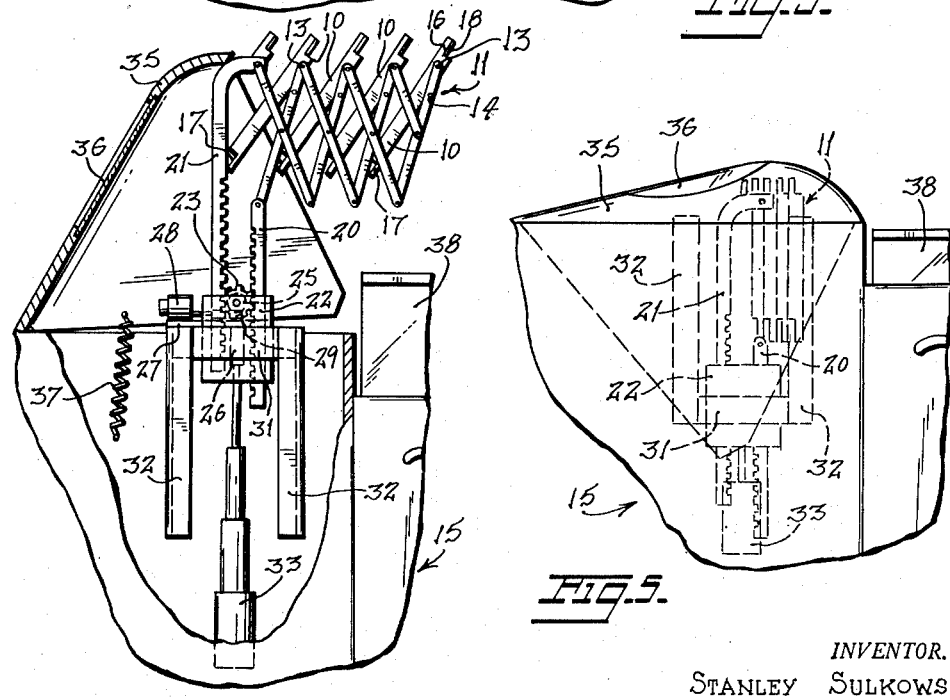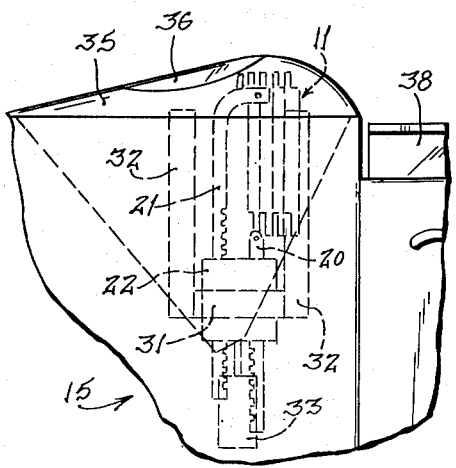

Patented Apr. 15, 1952

2,593,360

UNITED STATES PATENT OFFICE 2,593,360

CONVERTIBLE TOP FOR AUTOMOBILES

Stanley Sulkowski, Jr., Brooklyn, N. Y.

Application February 14, 1951, Serial No. 210,923

4 Claims. (Cl. 296—117)

1

This invention relates to vehicle roof constructions and pertains, more particularly, to a novel convertible automobile top construction.

One object of the present invention is to provide a roofing arrangement of sturdy slat construction which is retractable in the manner of a Venetian blind.

Another object of the present invention is to provide in a slat roof construction means for preventing seepage of rain or other moisture therethrough.

Another object of the present invention is to provide novel means whereby a slat roof may be facilitatedly extended over an automobile and just as easily retracted when such is desired.

Still another object of the present invention is to provide means operable to raise the slat roof construction to an operative position and to lower same to an inoperative position in which it is enclosed in an automobile body.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary plan view partially broken away to illustrate certain features of the invention.

Fig. 2 is a fragmentary right side elevational view also partially broken away to illustrate features of the invention.

Fig. 3 is a sectional view taken along the lines 3—3 in Fig. 1.

Fig. 4 is a fragmentary and partially broken away right side elevational view illustrating the roof construction partially retracted.

Fig. 5 is a fragmentary right side elevational view illustrating diagrammatically the roof construction in its lowered inoperative position.

Now, with reference to the drawings in more detail, and particularly to Figs. 1 and 2, it will be seen that the roof construction comprises a plurality of slats 10 adapted to be extended as to be coplanar by a pair of lazy-tongs 11. Each of the slats 10 is connected pivotally at the forward side portions thereof to certain elements of the said lazy-tongs by pins 13; and, studs 14 extending inwardly from said certain lazy-tong elements are provided for engaging the under sides of and cooperating with the said slats 10. It will be seen that when the said lazy-tongs are

2 extended in the manner shown in Figs. 1 and 2, the mentioned studs 14 will maintain the said slats 10 horizontal and coplanar to thereby form a roof or covering for a vehicle such as that designated 15.

In order to prevent seepage of rain or other moisture through the said slats 10 when same are maintained extended, each slat is formed along its forward edge with an undercut step 16 and along its rear edge with an overcut step 17. Secured to each slat 10 at the undercut step 16 is a strip 18 of rubber or like material; which strip, when the undercut step of one slat associates with the overcut step of another, effectively prevents moisture seepage therebetween.

Inasmuch as the means provided for operating the lazy-tongs 11 from each side of the vehicle are identical, description herein will be of the right side means only.

Pivotally connected to the last elements of the lazy-tong 11 are first and second racks 20 and 21, respectively, which are both vertically slidingly supported by a housing 22 or the like. Provided for meshing with both of the said racks 20 and 21 is a pinion 23 secured on a drive shaft 24 journalled in the said housing 22.

As seen best in Figs. 1 and 3, said drive shaft 24 is provided also with a fixedly secured worm gear 25. A cross bar 26 secured between and thereby connecting the mentioned rack housings on either side of the vehicle provides support for a plate 27 upon which is mounted a low speed reversible motor 28 for operating a worm 29 cooperating with the said worm gear 25.

No means for controlling the motor 28 are shown herein, however, it will be seen that this arrangement is operable for either bringing the last elements of the lazy-tong together for extending same as shown in Figs. 1 and 2, or for spreading said elements to thereby retract the said lazy-tong in the manner shown in Fig. 4. It will be seen, also, that as the lazy-tong is retracted the slats 10, due to their own weight, folow the studs 14 and assume the substantially vertical stacked positions also seen in Fig. 4.

With the slats retracted in the manner above, it is desirable that they be lowered to an inoperative position within the vehicle body. For this purpose the housing 22 is provided with a vertical plate 31 secured thereto and arranged to have its extremities ride slidingly in a pair of channeled members 32 secured to the side of the vehicle body. Thusly, the whole roof extending and operating construction is slidingly movable either from a raised operative position to a lowered inoperative position or from a lowered to a raised position.

Means for effecting the raising and lowering of the said construction comprises a jack 33 located beneath either end of and secured to the said cross bar 26. It will be understood that while the present embodiment shows a telescoping hydraulic jack operable by means not shown, any controllable raising and lowering means may be suitably employed in the present invention.

Hingedly connected to the vehicle body is a hood 35 including in its construction a rear view window 36, which hood is interconnected to either side of said vehicle body by a spring 37. This arrangement causes the said hood to follow the movements of the second rack 21 which it normally engages.

Now after the slats 10 have been retracted in the manner described above, the mentioned jacks are operable to lower the whole construction to the position indicated diagrammatically by dot and dash lines in Fig. 5. When in this position the said construction is covered by the hood 35, which, as mentioned, is caused to follow the said rack 21 by the influence of the springs 37.

As best seen in Fig. 2, side windows 38 in the vehicle doors may be of dual and spaced apart plate construction, which when raised will permit the said lazy-tongs to be received therebetween.

In order to overcome the collapsing effect of the weight of the said slats 10 on the lazy-tongs 11, and to thereby assure a maintained extension thereof when such is desired, the design of the worm employed is of the self-locking type. That is, the worm gear cannot turn the worm; and, therefore, the lazy-tongs will not collapse until the motor is reversed to thereby counterrotate the worm gear. This also obviates the need for means to lock the said roof construction in an extended position.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a convertible vehicle roof construction having parallel lazy-tongs for extending and retracting roof slats, a pair of guided racks connected to each of said lazy-tongs, a pinion commonly meshing with each pair of said racks, and reversible operating means controllable for turning said pinion to thereby selectively extend or collapse said lazy-tongs.

2. In a convertible vehicle roof construction having parallel lazy-tongs for extending and retracting roof slats, a pair of guided racks connected to each of said lazy-tongs, a pinion commonly meshing with each pair of said racks, and reversible operating means controllable for turning said pinion to thereby selectively extend or collapse said lazy-tongs, and a self-locking worm gear arrangement between said pinion and operating means effective for maintaining said lazy-tong arrangements in any extended position.

3. In a convertible vehicle roof construction having parallel lazy-tongs for extending and retracting roof slats, a pair of guided racks connected to each of said lazy-tongs, a pinion commonly meshing with each pair of racks, reversible operating means manually controllable for turning said pinions to extend or collapse said lazy-tongs, a self-locking worm gear arrangement between said pinions and said operating means for maintaining said lazy-tongs in the desired extended position, each of said pinions and the respective racks being mounted in housings, said housings being supported for vertical sliding movements, and means for lowering said housings in the collapsed position of the lazy-tongs and roof slats to retract the lazy-tongs and the roof slats into the vehicle.

4. In a convertible vehicle roof construction having parallel lazy-tongs for extending and retracting roof slats, a pair of guided racks connected to each of said lazy-tongs, a pinion commonly meshing with each pair of racks, reversible operating means manually controllable for turning said pinions to extend or collapse said lazy-tongs, a self-locking worm gear arrangement between said pinions and said operating means for maintaining said lazy-tongs in the desired extended position, each of said pinions and the respective racks being mounted in housings, said housings being supported for vertical sliding movements, and means for lowering said housings in the collapsed position of the lazy-tongs and roof slats to retract the lazy-tongs and the roof slats into the vehicle, said lowering means comprising a cross bar extended between said housings joining them for unitary vertical sliding movements, and jacks mounted within the vehicle and engaging said cross bar.

STANLEY SULKOWSKI, Jr.

REFERENCES CITED

The following references are of record in the file of this patent:

UNITED STATES PATENTS

| Number | Name | Date |
| --- | --- | --- |
| 1,279,410 | Nakamizo | Sept. 17, 1918 |
| 1,390,137 | King | Sept. 6, 1921 |
| 1,926,757 | Tendero | Sept. 12, 1933 |

FOREIGN PATENTS

| Number | Country | Date |
| --- | --- | --- |
| 100,195 | Germany | Nov. 13, 1897 |